Figure 6:
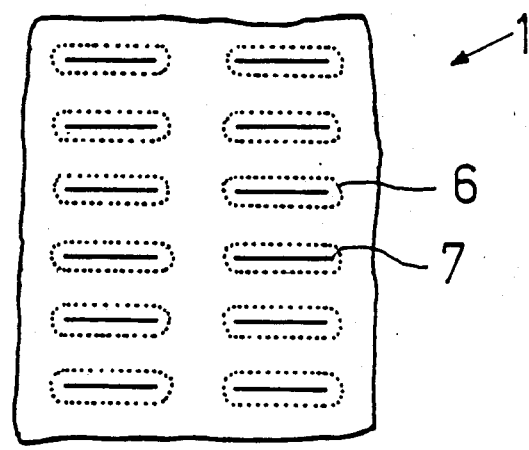

United States Patent [19]

Tesch

[11] Patent Number: 4,770,919

[45] Date of Patent: Sep. 13, 1988

[54] MULTILAYER INSULATING BODIES, PROCESS FOR THEIR PREPARATION AND APPLICATION

[76] Inventor: Günter H. Tesch, Avenue Jean-Marie-Musy 15, Fribourg, Switzerland

[21] Appl. No.: 23,561

[22] PCT Filed: May 16, 1986

[86] PCT No.: PCT/EP86/00296

§ 371 Date: Feb. 27, 1987

§ 102(e) Date: Feb. 27, 1987

[87] PCT Pub. No.: WO86/07011

PCT Pub. Date: Dec. 4, 1986

[30] Foreign Application Priority Data

May 21, 1985 [CH] Switzerland .................. 2157/85
Sep. 20, 1985 [CH] Switzerland .................. 4039/85

[51] Int. Cl.$^4$ ............................................. B32B 3/10
[52] U.S. Cl. ................................... 428/136; 428/137; 428/198
[58] Field of Search ............... 428/137, 198, 136, 284, 428/74

[56] References Cited

U.S. PATENT DOCUMENTS 2,781,820 2/1957 Rogers ................................ 428/74
3,020,183 2/1962 Calvaresi ........................... 428/74
3,975,859 8/1976 Muller ............................... 428/131

FOREIGN PATENT DOCUMENTS 1035490 7/1966 United Kingdom .

Primary Examiner—Alexander S. Thomas
Attorney, Agent, or Firm—Bacon & Thomas

[57] ABSTRACT

A multilayer insulating body (1) with two outer layers (2, 3) joined together over at least part of their surface, is described, the body being characterized in that between the two outer layers (2, 3) an intermediate layer (5) containing textile fibers (4) is arranged, that at least the two outer layers (2,3) are joined over at least part of their surface at joint locations (6), in particular by welding. Within the area of the joint locations (6) the entire insulating body (1) may comprise passages (7), in particular slits. An insulating body (1) is obtained in this manner, which is thermally insulating by means of its intermediate layer (5) containing the fibers (4), wherein the fibers (4) may be sealed of gas and vapor tight against the environment. On the other hand, the entire insulating body (1) may be made gas and vapor permeable in spite of the slits (7).

15 Claims, 2 Drawing Sheets

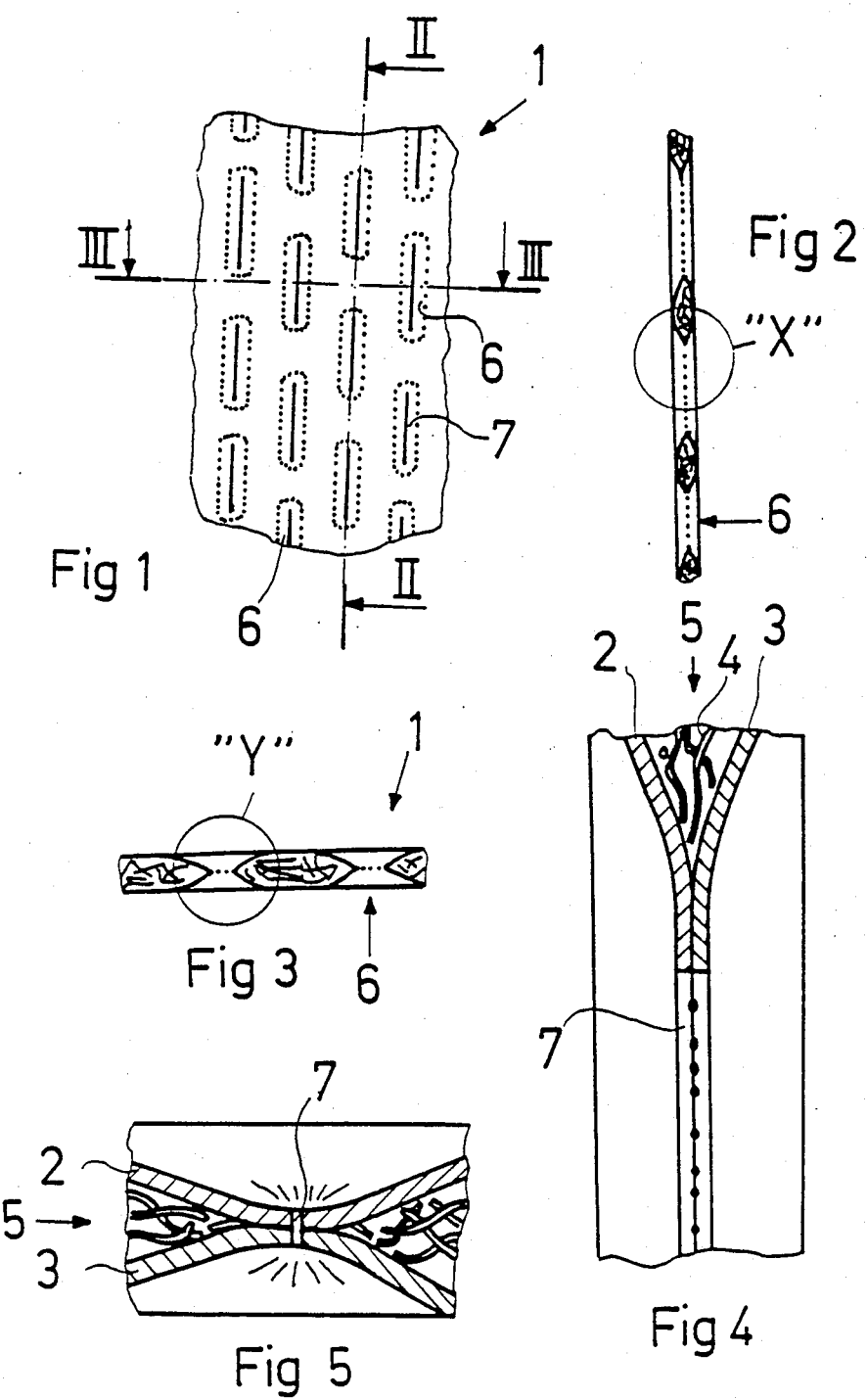

MULTILAYER INSULATING BODIES, PROCESS FOR THEIR PREPARATION AND APPLICATION

The invention concerns a multilayer insulating body according to the preamble of claim 1, a process for its preparation and its application.

Insulating bodies are used for example as protective sheets to obtain thermal and/or humidity insulation, either to protect persons against temperatures and/or humidity or to protect plants, machines, construction sites, etc. against weather effects.

Protective sheets, in particular multilayer sheets are also used as attenuating materials against impacts or the like.

Thus for example a so-called step sheet is known; it consists of two plastic sheets bonded together over part of their surfaces, at least one of then comprising a plurality of cup like bulges. The two sheets are bonded together at their locations outside the bulges in a manner such that air is enclosed tightly in the bulging parts extending away from the other plastic sheet. Pressure applied to the sheet compresses the air in the cuplets. Impacts or the like may be attenuated in this manner. However, the manufacture of such stepped films is relatively expensive. In the process, usually a flat sheet to which the bulges are to be applied, is passed over a roll the surface of which comprises cup like recesses. The film is drawn in part into the recesses, i.e. it is deep-drawn. A second sheet is then placed onto the first which is still on the roll and completely bonded to it in the loactions outside the bulges. The deep drawing process results in different wall thicknesses of the sheet comprising the bulges.

Multilayer insulating bodies are further known in which a plastic sheet is laminated to the aluminum foil. Sheets of this type are used for example in camping as substrates to retain the heat of the human body.

Single layer insulating bodies, for example foil, are also used to cover plants. Thus, for example DE-A-No. 2 450 114 describes a plastic foil in the form of a sheet to cover low growing plants, in which slits aligned in the longitudinal direction of the sheet make possible expansion in the transverse direction of the sheet, in keeping with the growth of the plants.

It is the object of the invention to provide an insulating body of the aforementioned generic type, having further advantages relative to the known insulating bodies.

This object is attained by the characteristic clause of claim 1. The insulating body according to the invention comprises between the two outer layers an inner layer containing fibers, wherein at least the two outer layers are bonded, preferably welded, to each over part of their surfaces. However, the two outer layers may also be adhesively bonded together through the intermediate layer or with the latter. In the area of the bonded locations passages penetrating through the entire insulating body are further arranged. The fibers may consist in particular of textile fibers.

The fibers of the intermediate layer have different functions. In areas where there are no bonded locations, the fibers, which are then loose, serve to maintain the two outer layers spaced apart, whereby an air cushion is formed between said outer layers and the spacer fibers. In the bonded locations the fibers welded or adhesively bonded together with the outer layers serve to reinforce the bonds.

In this manner a multilayer insulating body is obtained, which has insulating effects, while remaining permeable.

The joint locations may have different surface configurations. In addition to point shaped joints, strip bonds are preferred. These strip like bonds may be arranged so that the strips are in rows constituting the longitudinal extent. Welded joints of adjacent rows may be offset relative to each other and in particular they may mutually overlap. This results in an insulating body having different bend elastic properties in the longitudinal and the transverse directions.

The joint locations may be laid out in a distribution of the entire insulating bodies. In particular, strip like joint locations may be aligned of the surface of the insulating body so as to form a pattern.

The insulating body is preferably in the shape of a web and the strip like joint locations are aligned parallel to the longitudinal edges of the web, with the joint locations preferably extending continuously through the entire length of the web. The joint locations of adjacent rows may also be laid out offset with respect to each other, preferably in an overlapping manner.

The two outer layers may consist of different materials. Preferably, at least one outer layer consists of a gas and vapor tight material, preferably a plastic sheet. The other outer layer may consist of the same sheet, but the latter or even both outer layers may also formed by fabrics, preconsolidated, for example needled fiber fleece, fleece fabrics or spunbonded fabrics, or the like. It is not necessary for the second outer layer to be gas and vapor tight.

The passages penetrating through the entire insulating body in the area of the joint locations consist in a particularly preferred form of embodiment of preferably longitudinal, straight slits, arranged preferably in the longitudinal axis of the joint locations and spaced apart preferably uniformly from their edges.

Although the insulating body as a whole is no longer gas and vapor tight even if both outer layers consist of gas and vapor tight materials, the textile fibers contained therein are protected against the atmosphere of the environment by that the passages are located only in areas wherein joint locations are present.

Depending on the pattern of the joint locations, the slits may form a corresponding pattern over the surface of the insulating body.

If at least the slits are arranged in parallel rows offset relative to each other, an insulating body of this type may be stretched transversely to the longitudinal direction of said rows, whereby the slits are caused to open, thereby twisting the webs located between them.

An insulating body designed in this manner may then be used as a cover sheet for plantings, as described for example in DE-A-No. 2 450 114. Relative to this know slit sheet, the insulating body according to the invention has the advantage that it is not only more stable, as in particular the slits do not tear under a heavy stress, but that it offers better thermal insulation than the known sheet. The advantages of the automatic "growth" of the sheet in keeping with the growth of the plants is preserved.

An insulating body according to the invention may also be used to protect persons and animals, together with machines, construction sites or the like, in the form of thermal and humidity insulation. By virtue of the expandability of the sheet provided by the slits, the sheet is able to readily adapt to the human or animal body to be protected.

Air and wetness, such as sweat and the like, can easily pass through the body by means of the passages, without the materials for example textile fibers such as individual fibers, fiber fleece, synthetic down, spherical yarn (EP-A-No. 0.013.427) or the like contained in the insulating body coming into contact with said air or humidity. It is therefore no longer necessary to clean such an insulating body internally or to air it.

An insulating body of this type which is slit in the areas of the passages also, may comprise passages, for example slits in the two outer layers also, if so desired. By means of the suitable placement of the slits easier draping of such insulating bodies may be obtained.

A process for the production of insulating bodies of this type is characterized in that a layer containing fibers is inserted between two outer layers and that at least the two outerlayers are joined through the fiber containing intermediate layer, preferably welded or adhesively bonded, whereupon the insulating body is provided with passages in the joint areas.

Welding of this type may be carried out in different manners. Depending on the materials used for the fibers and the two outer layers and on the welding temperature, the fibers may be destroyed in the weld zone, for example by fusing with the outer layers; on the other hand, the fibers may be melted on to the extent that their surface is bonded to the outer layers. It is possible for example, to use a fiber material which does not melt at the melting temperature of the outer layers, so that the fibers are bonded to the outer layers by the latter only. The essential condition is that the outer layers are bonded together in the weld zones, while including the fibers between themselves, in a manner such that a gas and vapor tight joint is created.

A mixture of fibers is used preferably in the intermediate layers. Such a mixture may comprise coarse and fine fibers, whereby use is made of the fact that the finer fibers fuse easier and above all more rapidly, than coarse fibers of the same material. However, a mixture low and high melting or even nonmelting fibers may also be used, together with a combination of both mixtures. Particularly if only nonmelting fibers are used, the choice of the material of the two outer layers should be such that they adhere to the fibers.

Depending on the intended configuration of the cross section of such an insulating body, there are different possible layouts of the three layers relative to each other prior to their being joined together.

Thus, is is possible to place onto one web like outer layer the intermediate layer and on the latter the second outer layer, in a flat and uniform manner, whereupon at least the two outer layers are joined together at predetermined joint locations.

It is further possible to deform a web like outer layer out of its plane transversely to its longitudinal direction in a wave like configuration, deposit the fibers for the intermediate layer essentially in the valleys of the waves, and following the placement of the second outer layer, bond the outer layers together in the areas of the top of the waves of the corrugated outer layer only.

A web like outer layer may also consist of a shrinkable sheet, preferably a sheet of plastic, and the intermediate layers and the other outer layer may be placed essentially flat on the shrinkable web and joined to it over part of their surfaces, whereupon the multilayer web is exposed to a shrinking process with only the one sheet shrinking. The shrinkable sheet is advantageously shrunk transversely to the longitudinal direction of the web only.

It may be obtained by the latter measures that at least one of the outer layers remains essentially flat in spite of the joint locations connecting the two outer layers.

If the passages are to consist of slits, simultaneously with or subsequently to the welding or adhesive bonding the insulating body is provided with with slits in the areas of the strip like joint locations, in their longitudinal direction and through the three layers. Slitting processes are known in particular in the foil production and processing.

An insulating body of this type, the outer layer of which is for example vapor tight and the other outer layer consists for example of a fleece material, may be used, depending on the configuration of the intermediate layer as a cushion and in particular a pillow case.

Further advantages and details of the invention will become apparent from the examples of embodiment described below with reference to the drawing, in which FIG. 1 shows schematically a top elevation of a first form of embodiment of the insulating body;

FIG. 2 a section through the insulating body according to FIG. 1 on the line II—II;

FIG. 3 a section through the insulating body according to FIG. 1 on the line III—III;

FIG. 4 an enlarged detail "X" according to FIG. 2;

FIG. 5 an enlarged detail "Y" according to claim 3 and

FIG. 6 a top elevation of a second form of embodiment of an insulating body.

A multilayer insulating body 1 consists of two outer plastic sheets 2 and 3, between which an intermediate layer 5 containing textile fibers 4 is arranged. The three layers 2, 3 and 4 are joined together in certain joint locations 6, by welding in the present case. According to the figures, the weld joints are in the form of strips.

In said weld joint not only the two plastic sheets 2 and 3 are bonded together, but also between them the fibers 4 of the intermediate layer 5, so that here a gas tight welded connection of all three layers is present.

According to FIG. 1, the entire insulating body 1, of which only a part is shown, is provided with rows of weld joints 6, aligned parallel to each other and arranged in rows, with the individual weld joints 6 of one row being offset relative to the weld joints 6 of an adjacent rwo.

According to a form of embodiment of a web like insulating body 1, not shown, the weld joints 6 are parallel to its longitudinal edges and—in contrast to FIG. 1—are not interrupted but continuous.

According to FIG. 6, the weld joints 6 are laid out in a pattern, wherein the weld joints 6 are aligned parallel to each other, arranged in parallel rows, but in contrast to FIG. 1 are not offset with respect to each other.

In this case, in the longitudinal axis of a strip shaped weld joint 6, slits 7 are arranged, said slits and in particular their ends, are spaced apart from the edges of the weld joint 6, uniformly in this instance. The slits 7 penetrate the entire insulating body 1. which is seen most clearly in FIG. 5. As the result of the gas tight welding of the three layers, neither humidity nor a gas, such as air of the like, is able to penetrate into the intermediate layer 5 containing the fibers.

The welding of the fibers in the zones of the weld joints 6 and the slits 7 also leads to the fact that the slits 7 cannot tear further, whereby the insulating body 1 is rendered highly stable, in spite of the slits.

In case of weld joints 6 extending over the entire length of the insulating body 1, the slits 7 may be laid offset relative to each other, as shown in FIG. 6.

An insulating body 1 with a layout of the slits and for example a layout of the weld joints according to FIG. 1, may be expanded very easily transversely to the longitudinal direction of the slits 7, whereby the slits are opened.

If such an insulating body 1 is to be used as a cover for plants, its outer shape adapts itself to the form of the plants. In particular, such an insulating body may also be used as a so-called "growing foil", as described in DE-AS No. 2 450 114. Compared to the "growing foil" described therein, the insulating body shown and described here has the great advantage that thermal insulation is higher by several orders of magnitude. The air enclosed in the intermediate layer 5 and present between the fibers 4, which is not being exchanged or moved, serves as an insulating layer. The fibers which are not bound between the weld joints 6, keep the two plastic sheets 2 and 3 separated from each other, so that—depending on the amount of fibers 4 present—relatively much air is present between the plastic sheets 2 and 3.

In such an application the distance between the parallel rows of joints 6 with the slits 7, and the slit length may amount to between 1 cm and 5 cm, with no agreement of the two values being required. The distance between the slits 7 of a row should be less than the length of the slits and should amount in the case of for example 3 cm long slits to approximately 1 cm. The weight of the fibers 4 of the intermediate layer 5 may amount to 30 g/cm$^2$, while the weight of the outer layers 2 and 3 consisting of plastic sheets, should be as low as possible, but on the other hand these sheets must be stable enough not to be destroyed by the plants.

Such an insulating body 1 provided with passages 7, may also be used as a garden tunnel. If in place of the slits 7, for example holes are provided, the rods supporting the tunnel may be inserted through the holes and holding means may be secured in the ground through said holes. A garden tunnel of this type provides very strong thermal insulation by means of the air enclosed between the two outer layers 2 and 3, while on the other hand an exchange of air may still takeplace through the passages 7.

Weighting elements may further be inserted through the passages 7, but this is also possible with joints 6 provided along a web shaped insulating body 1, between the rows of such joint locations.

In insulating body with slits 7 that are not offset, as shown for example in FIG. 6, or with holes in place of slits, is suitable for example as bed covers, which one one hand always retains its overall surface area and acts as thermal insulation, but on the other, permits the equalization of air and humidity.

Such an insulating body 1, particularly if it contains fibers 4 as the intermediate layer 5. may also be used as the initial material for clothing, by cutting tht flat insulating body for example into certain shapes, which subsequently may be combined into items of clothing, for example by adhesive bonding, welding or sewing. In this case care must again be taken—especially during subsequent sewing—that at the cut locations again a gas and fluid tight joining of the two outer layers, for example by welding or adhesive bonding, takes place. Cutting therefore may be carried out under the action of heat, for example by weld cutting.

In such an insulating body used as a textile material, at least one outer layer 2 and/or 3 may consist of a fiber containing material, such a fabric, a spunbond, a reinforced fleece, such as for example a needle fleece. The intermediate layer 5 is then capable of absorbing sweat or similar vapors. If the outer layer itself is gas and vapor tight, essentially nothing can penetrate from the other side into the intermediate layer 5.

According to a form of embodiment of the invention which is not shown, two such insulating bodies 1 may be connected in the manner of a sack at their edges with each other. Herein outside the sack one sheet may arranged as the outer layer of the individual insulating body and inside a textile material may be present. This configuration may be used for example as a sleeping bag, which hinders or prevents the penetration of water from the outside, while it is capable of absorbing sweat or other vapors on the inside.

A sack-like, double insulating body may also be filled with other materials. It may then be appropriate to mutually interchange the two outer layers of the individual insulating bodies, i.e. place the sheet inside the sack and the textile material on the outside.

In the production of an insulating body 1 containing fibers in the intermediate layer 5, it is possible for example to deposit a fiber containing intermediate layer and over it a shrinkable sheet 2 onto a nonshrinking sheet 3, joined with the latter at the aforementioned joint locations 6 and apply the passages 7, whereupon the insulating body is subjected to a shrinking process with only one sheet 3 actually shrinking. The nonshrinking sheet 3 the bulges and an insulating body that is essentially flat on one side is obtained. To permanently preserve the fiber containing cavities, an insulating body 1 comprising a plurality of strip shaped joint locations 6 extending continuously over the length of a web, may be provided with joint locations to be considered shut welds and sealing off individual cavities. The air can then no longer escape from the cavities forming the intermediate layer 5, even if pressure is applied to the insulating body.

It is further possible to apply one of the outer layers preformed in the a "corrugated form" to the other outer layer and then joining them, whereupon the strip shaped joint locations 6 are in the valleys of the corrugations resting on the other outer layer. The fibers then may be contained only in the intermediate spaces between the two outer layers or they may be arranged over the entire surface.

It is also possible to place one outer later in folds onto the other outer layer and to apply the joints in locations in which the folded outer layer is present in a single layer only. The fibers may then be inserted previously into the folds or they may again be distributed over the entire surface.

I claim:

1. A multilayer insulating body with two outer layers (2, 3) joined together at least over part of their surfaces, and with a fiber (4) containing intermediate layer (5) being arranged between the two outer layers, at least the two outer layers are joined together at joint locations (6) in the shape of strips over part of their surfaces and in the areas of the joint locations (6), passages (7) formed by slits penetrating through the entire insulating body (1) are provided, said slits being shorter than the length of the joint locations and being preferably centered on the longitudinal axis of the strip shaped joint locations.

2. Insulating body according to claim 1, characterized in that at least the two outer layers (2, 3) are welded together in the joint locations in the form of welds.

3. Insulating body according to claim 2, characterized in that the joint locations (6) are located in a distribution over the entire insulating body (1).

4. Insulating body according to claim 3, characterized in that the insulating body is web shaped and that the strip shaped joint locations (6) are aligned parallel to the longitudinal edges of the web.

5. Insulating body according to claim 4, characterized in that the joint locations (6) are extending continuously over the entire length of the web.

6. Insulating body according to claim 4, characterized in that the joint locations (6) are laid out in rows parallel to the edges of the web.

7. Insulating body according to claim 6, characterized in that the joint locations (6) of adjacent rows are offset relative to each other and preferably are overlapping.

8. Insulating body according to claim 1, characterized in that the strip shaped joint locations (6) are aligned over the surface of the insulating body (1) so as to form a pattern.

9. Insulating body according to claim 8, characterized in that at least one of the two and preferably both, outer layers (2, 3) consists or consist of a sheet.

10. Insulating body according to claim 9, characterized in that the passages (7) are slits passing through the entire thickness of the insulating body (1) and that said slits are shorter than the length of the joint locations (6) and are preferably centered on the longitudinal axis of the strip shaped joint locations (6).

11. Insulating body according to claim 10, characterized in that in the case of strip shaped joint locations (6) arranged in parallel rows, the slits (7) of adjacent rows are offset relative to each other and preferably are overlapping.

12. Insulating body according to claim 11, characterized in that at least one of the two outer layers (2, 3), in particular the outer layer consisting of the gas and vapor tight material, comprises passages, preferably slits, outside the joint locations (6).

13. Insulating body according to claim 12, characterized in that the web shaped insulating body (1) comprises weights, preferably one or several weighting elements, at its longitudinal edges, said weighting elements being arranged preferably between the two outer layers (2, 3).

14. Insulating body according to claim 13, characterized in that the fibers (4) are synthetic fibers and that preferably the intermediate layer (5) containing the fibers (4) consists of a fiber fleece.

15. Insulating body according to claim 14, characterized in that the fibers (4) are present in the intermediate layer (5) with a weight per unit area of 10 to 200 g/cm$^2$, preferably 15 to 50 g/m$^2$.

* * * * *